May 8, 1951 W. BORNEMANN 2,552,251
PHOTOGRAPHIC ONE-STEP PROCESS PRINT-MAKING MACHINE
Filed May 18, 1949 9 Sheets-Sheet 2
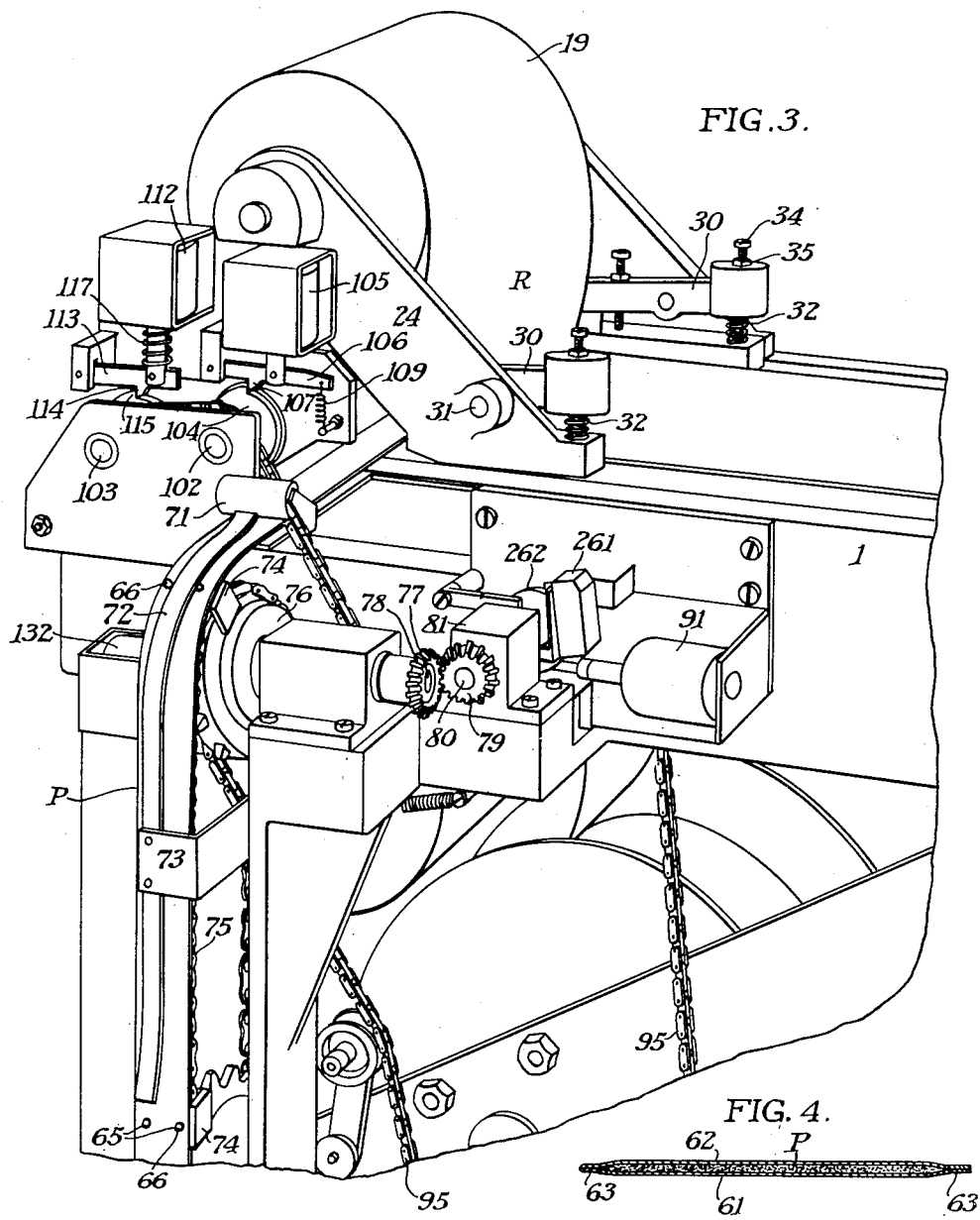
WILLIAM BORNEMANN
INVENTOR
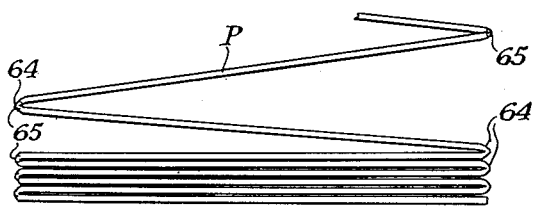
ATTORNEYS

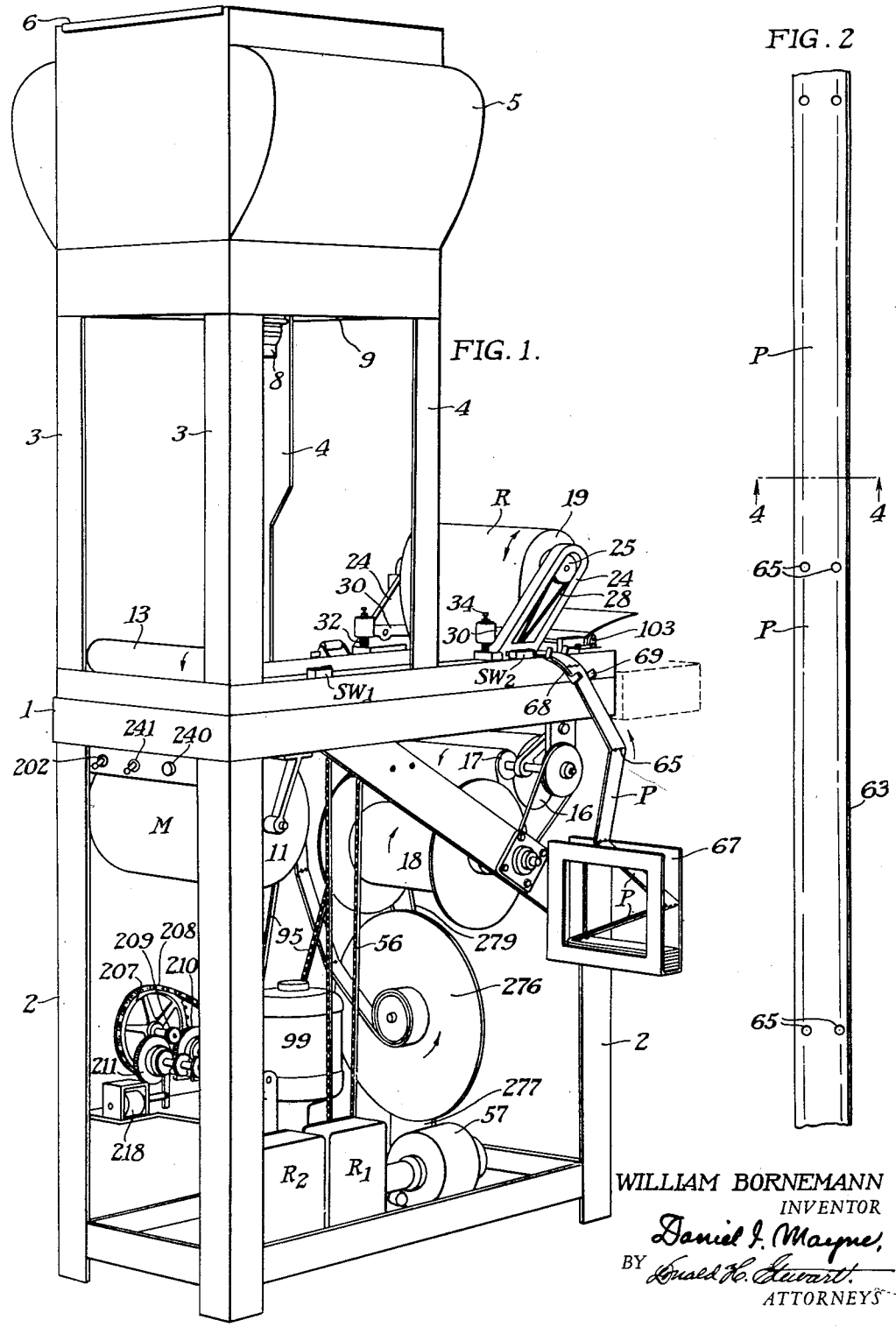

WILLIAM BORNEMANN
INVENTOR

May 8, 1951 W. BORNEMANN 2,552,251
PHOTOGRAPHIC ONE-STEP PROCESS PRINT-MAKING MACHINE
Filed May 18, 1949 9 Sheets-Sheet 4

WILLIAM BORNEMANN
INVENTOR
BY
ATTORNEYS

May 8, 1951 W. BORNEMANN 2,552,251
PHOTOGRAPHIC ONE-STEP PROCESS PRINT-MAKING MACHINE
Filed May 18, 1949 9 Sheets-Sheet 5

WILLIAM BORNEMANN
INVENTOR

BY Daniel F. Mayne,
Donald H. Stewart
ATTORNEYS

May 8, 1951 W. BORNEMANN 2,552,251
PHOTOGRAPHIC ONE-STEP PROCESS PRINT-MAKING MACHINE
Filed May 18, 1949 9 Sheets-Sheet 6

WILLIAM BORNEMANN
INVENTOR
BY Daniel I. Mayne,
Donald H. Stewart.
ATTORNEYS

May 8, 1951 W. BORNEMANN 2,552,251
PHOTOGRAPHIC ONE-STEP PROCESS PRINT-MAKING MACHINE
Filed May 18, 1949 9 Sheets-Sheet 7
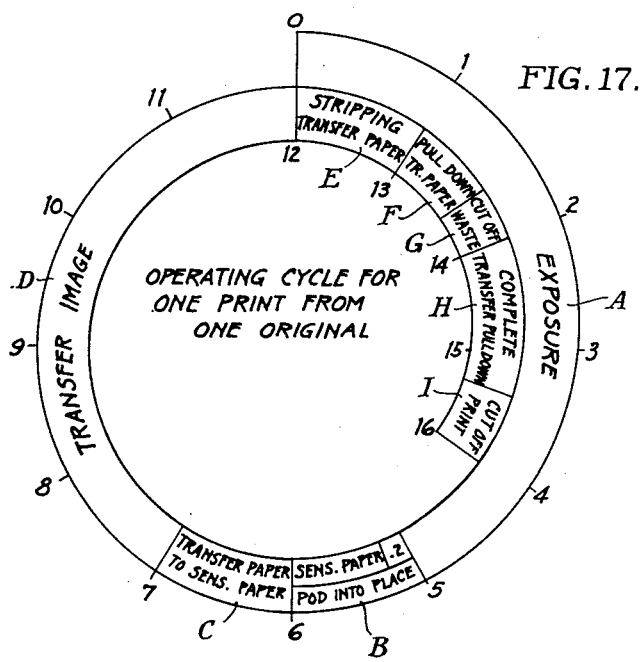
FIG. 17.
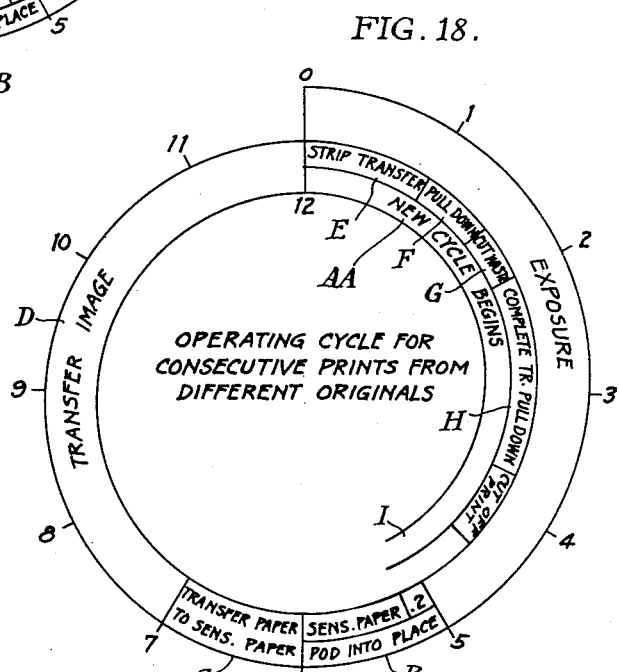
FIG. 18.
FIG. 19.
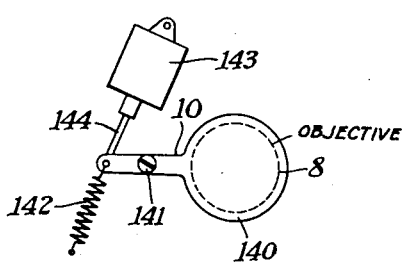
WILLIAM BORNEMANN
INVENTOR
BY Daniel I. Mayne
Donald H. Stewart
ATTORNEYS May 8, 1951 W. BORNEMANN 2,552,251
PHOTOGRAPHIC ONE-STEP PROCESS PRINT-MAKING MACHINE
Filed May 18, 1949 9 Sheets-Sheet 9

WILLIAM BORNEMANN
INVENTOR
BY Daniel I. Mayne
Donald H. Stewart
ATTORNEYS

Patented May 8, 1951

2,552,251

UNITED STATES PATENT OFFICE 2,552,251

PHOTOGRAPHIC ONE-STEP PROCESS PRINT-MAKING MACHINE

William Bornemann, Rochester, N. Y., assignor to Eastman Kodak Company, Rochester, N. Y., a corporation of New Jersey Application May 18, 1949, Serial No. 93,972

11 Claims. (Cl. 95—14)

This invention relates to photography and particularly to a machine for the rapid reproduction of prints. One object of my invention is to provide a machine primarily intended for making prints by the Edwin H. Land one-step process, in which a light-sensitive coated sheet of suitable material may receive a latent image and the print on a receiving sheet and the image on the sensitized material may be processed together by pressing a sheet of receiving paper into contact with the exposed light-sensitive coated material covered with a developing agent. Another object of my invention is to provide a machine in which the various parts will move through a cycle, and in which the steps of the cycle will be automatically controlled. Another object of my invention is to provide a machine in which certain steps of the cycle may be accurately timed. Another object of my invention is to provide a machine of the class described in which rolls of light-sensitized material and receiving paper are mounted in the machine together with a developing agent, so that exposed lengths of the sensitized material may be processed, transferring an image to the receiving sheet. Another object is to provide a machine by which these sheets may be pressed together, processed, stripped apart, and the prints cut up into the proper size. A still further object of my invention is to provide a machine for intermittently exposing the sensitized sheet to produce latent images thereon, and to immediately process and produce prints therefrom with but little attention from an operator. A still further object of my invention is to provide a means for automatically rolling a receiving sheet in contact with a sensitized sheet with a developing agent therebetween in which the pressure is accurately maintained during the rolling operation, and to provide a quick and satisfactory means of stripping the print from the processed exposed sensitized area in a substantially dry condition for use. A still further object of my invention is to provide a machine with automatic controls so that it will pass through its cycle of operation for producing a print, and this operation can be repeated at will by merely pressing a button. Other objects will appear from the following specification, the novel features being particularly pointed out in the claims at the end thereof.

In certain known types of photography, a light-sensitive coated material may be exposed, and a print produced by placing a receiving sheet in intimate contact with the exposed coated material with a processing agent therebetween. After a time interval, an image is produced from the sensitized material on the receiving sheet. Such a process has been described in the literature and in patents. In the "Journal of the Optical Society of America," vol. 37, No. 2, for February 1947, Mr. Edwin H. Land describes "A New One-Step Photographic Process," and reference may be had to this article for a disclosure of a process which may be automatically carried out by my improved printing machine. A series of patents have issued, particularly for developing cameras utilizing the same or a similar process:

U. S. 2,435,717–18–19–20, Lane, February 10, 1948; 2,443,154, Wolf, June 8, 1948; 2,451,820, Garrett, October 9, 1948; 2,455,111, Carbone et al., November 30, 1948; 2,455,125, Land, November 30, 1948; and 2,458,186, Messina et al., January 4, 1949. These patents likewise describe apparatus for making prints by the Land method. My machine is primarily intended for rapid copying by the one-step process referred to in the above literature and patents.

In order to produce the most satisfactory results, particularly in a copying machine, it is desirable to provide a machine in which a cycle of operations is sequentially controlled. Such a machine should particularly control the time of contact between the exposed sensitized coating material and a receiving sheet to permit the processing agent the proper time to form the image in the sensitized material which is at least partially transferred to the receiving sheet. Such a machine should also control the movements of the light-sensitive coated material, the processing agent carrier, the receiving sheet, the means for pressing the receiving sheet against the light-sensitive coated material, and should preferably also control the chopping up of the paper into print sizes and waste areas.

My invention is particularly directed to a machine for accomplishing these and other functions, and to a machine which may be operated by unskilled help which will successively produce accurately timed prints so that exact duplicates can be produced at will. The construction comprises certain combinations of elements and arrangement of parts which will serve as a preferred embodiment of such a machine which will be hereinafter more fully described in the following specification.

In this application, where "negative" or light-sensitive material is used, the term is to include any suitable base, such as paper or pyroxylin, which may be coated with a light-sensitive coating such as a silver halide emulsion capable of receiving a developable image after exposure. The exposed and developed image may be referred to as a "negative," although this use of negative differs from the ordinary negative in that it need not be a silver image on a pyroxylin film base which is a reverse of the desired final positive. As used in this specification, it merely means a developed image on any base which may be used to form the image which is, at least in part, transferred to a receiving medium. Certain known types of bromide papers are suitable for the "negative" of this process.

Where "receiving sheet," or paper, is referred to in this application, it is to be understood to cover any suitable coated or uncoated base material, preferably paper, which is adapted to receive an image by being brought into contact under pressure with the negative material in the presence of a suitable image-forming processing agent, such as described in the one-step photographic process article by E. H. Land, above referred to.

Coming now to the drawings wherein like references denote like parts throughout:

Fig. 1 is a perspective view of a typical machine constructed in accordance with and embodying a preferred form of my invention;

Fig. 2 is a top plan view showing an area of a developing "pod" which may be used in connection with the machine shown in Fig. 1;

Fig. 3 is an enlarged fragmentary perspective detail showing a portion of the machine shown in Fig. 1, and including certain details of the receiving sheet carriage, the pod-moving mechanism, and a wind-up for the used coated material;

Fig. 4 is a section through a pod taken on line 4—4 of Fig. 2;

Fig. 5 is a fragmentary detail illustrating a preferred arrangement of pod material folded into usable lengths for successive prints;

Fig. 17 is a diagrammatic chart showing a typical cycle of operations for a single print from a single original;

Fig. 18 is a similar chart showing a speeded-up cycle for making consecutive prints from different originals;

Fig. 19 is a diagrammatic view of a shutter and shutter-operating mechanism which may be used as a part of my machine;

Figure 6:
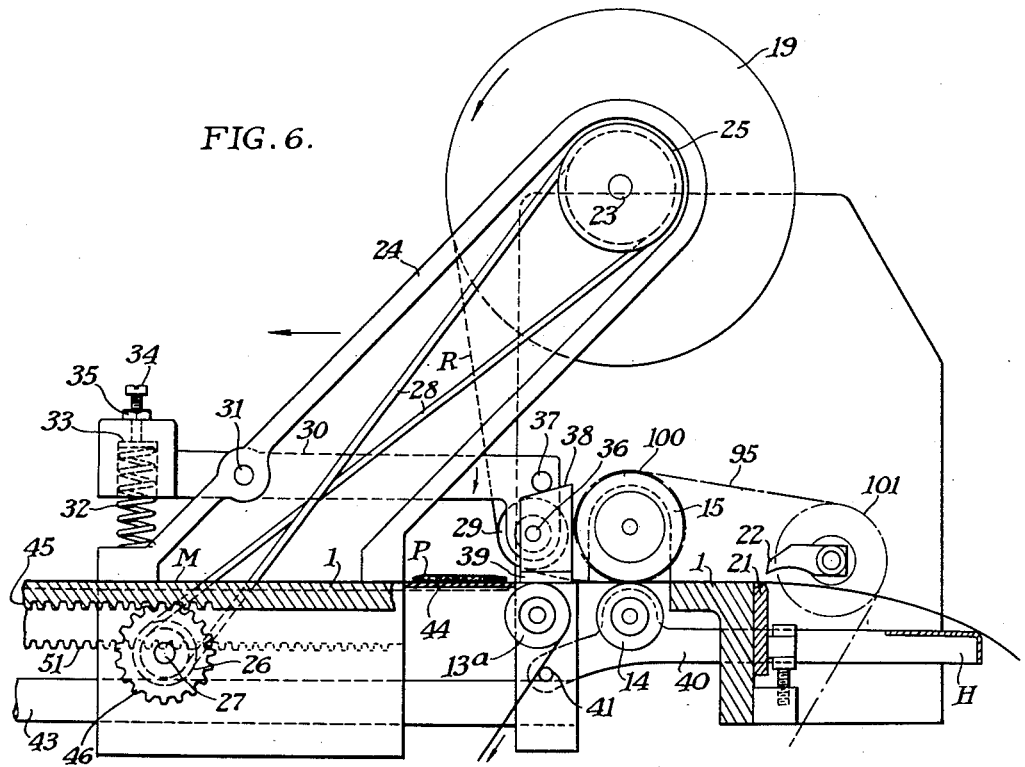
Fig. 6 is an enlarged fragmentary sectional detail showing a portion of the movable carriage, the receiving sheet-winding mechanism, the chopper, and the feed rolls, as well as a portion of the loading structure.

It may be noted that in the various views which have been above described, many of the parts which are unessential have been omitted and many of the views are at least partially schematic to better illustrate the invention.

This printing machine may be broadly described as a machine in which a sheet of photographically light-sensitive coated material, such as certain types of bromide paper, may be moved beneath an exposing station, and may be again moved onto a support so that a pod containing a processing agent may be moved across and beyond one end of the exposed area. A movable carriage then rolls an area of a receiving sheet, preferably of paper, over the pod and over the exposed sensitive coated sheet bearing the latent image. The pod is a processing agent enclosed in an easily rupturable package, or envelope, as described by E. H. Land. A roller movable with the slidable carriage ruptures the pod and smooths the receiving sheet upon the exposed material with the processing agent therebetween. After so ironing the sheets together, a time interval is permitted to elapse with the sheets in contact, after which a reverse movement of the carriage winds up the receiving sheet with the image thereon. Measuring rolls are then operated to unwind the resulting print; first, a short distance to unwind the waste material, at which time a chopper cuts off the waste. The measuring rolls then unwind a greater length of material containing the print and the chopper again cuts off the print, depositing it into a suitable container. While the amount of winding is arranged to care for the particular size of print and waste material between the prints, the relative distances may vary. However, as an example, the waste material may be one turn of the feed rolls and the print area may be three turns of the rolls. The exposed and developed sensitized material, after being used for producing the prints, may be wound on a wind-up which operates in synchronism with the feed rolls.

More specifically, as a preferred embodiment of my machine, the machine may consist, as shown in Fig. 1, of a table-like structure 1 supported on legs 2. Extensions of two of these legs 3 may be extended upwardly to form with a second pair of legs 4, a support for a lamphouse 5. This lamphouse may have a platen 6 for supporting material to be copied, and lamps 7 diagrammatically illustrated in Fig. 21 may be employed to illuminate the material to be copied. An objective 8 is supported on a bottom wall 9 of the lamphouse and a shutter 10, best shown in Fig. 19, may be employed in a suitable position, such as just above or below the objective 8, to control an exposure.

Figure 21:
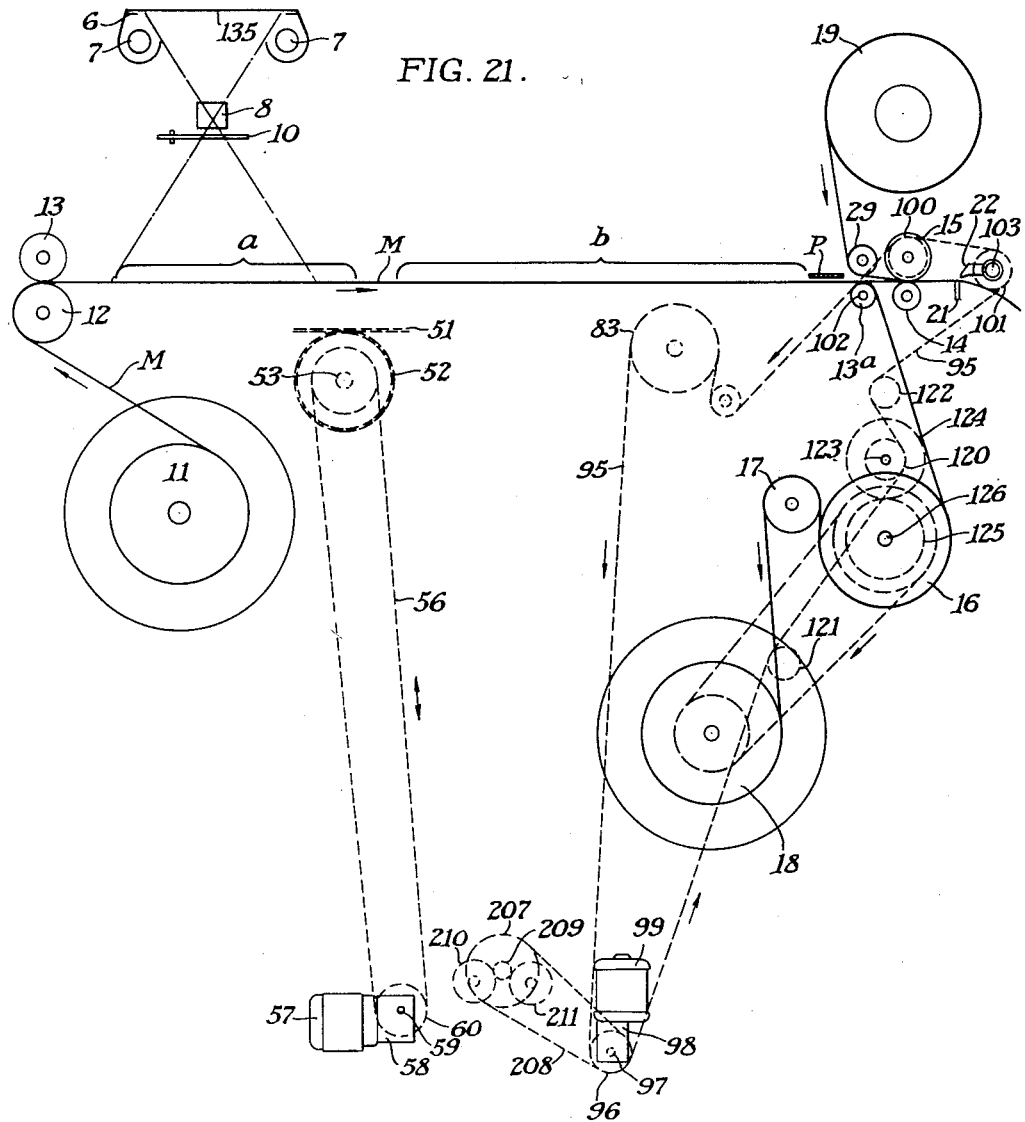
Fig. 21 is a schematic elevation showing diagrammatically the general arrangement of the various parts.

Referring to the diagrammatic showing of the machine in Fig. 21, I prefer to provide a roll 11 of the light-sensitive coated material beneath the table top 1 so that the sensitized material M may be drawn over a guide roll 12 beneath a roll 13. This material may be then led across the top of the machine over an idler 13a, thence downwardly around the pull-down roll 16, over an idler 17 to the wind-up roll 18. The receiving sheet may consist of a supply roll 19 from which the sheet passes below a pressure roll 29, and thence between the feed roll 15 and idler 14 and thence over a fixed blade 21 against which a movable knife blade 22 may cut off the lengths of the receiving sheet required to dispose of waste material and to chop off the prints as they are made.

The receiving sheet roll 19, best shown with its supporting carriage in Figs. 3 and 6, comprises a shaft 23 which is mounted to turn on suitable supporting arms, or brackets 24. A pulley 25 on the shaft 23 is connected to a pulley 26 on a shaft 27 by means of a belt 28 which is preferably crossed. The receiving sheet material R is led downwardly and under the pressure roller 29 which is supported by arms 30 on the carriage pivoted at 31 and being pressed in the direction shown by the arrow in Fig. 6 by a spring 32. This pressure may be adjusted by a spring presser member 33, a screw 34 and a set nut 35. The supporting arms 30 carry the pressure roller 29 by means of a shaft 36 extending between the arms, and also carry pins 37 which engage a cam surface 38. The cam surface is carried by brackets 39 supported by the table top. When the carriage is in its Fig. 6 position, the pressure roller 29 is raised. In this position the receiving sheet R may be threaded beneath the roller 29 and between the feed rolls 15 and 14 when the lower roll 14 is moved downwardly by moving the handle H in the direction shown by the arrow in Fig. 6. This turns the supporting arms 40 about their pivots 41, thereby separating the feed roller 14 by lowering it relative to roll 15 so that the receiving sheet R can be threaded through the path shown. In initially threading the sensitized material sheet M, it is merely passed from the supply roll 11 between rolls 12 and 13 across the table top 1 and over roll 13a, after which it is passed down around pull-down roll 16, over idler 17, and is attached to the take-up roll 18.

Figure 7:
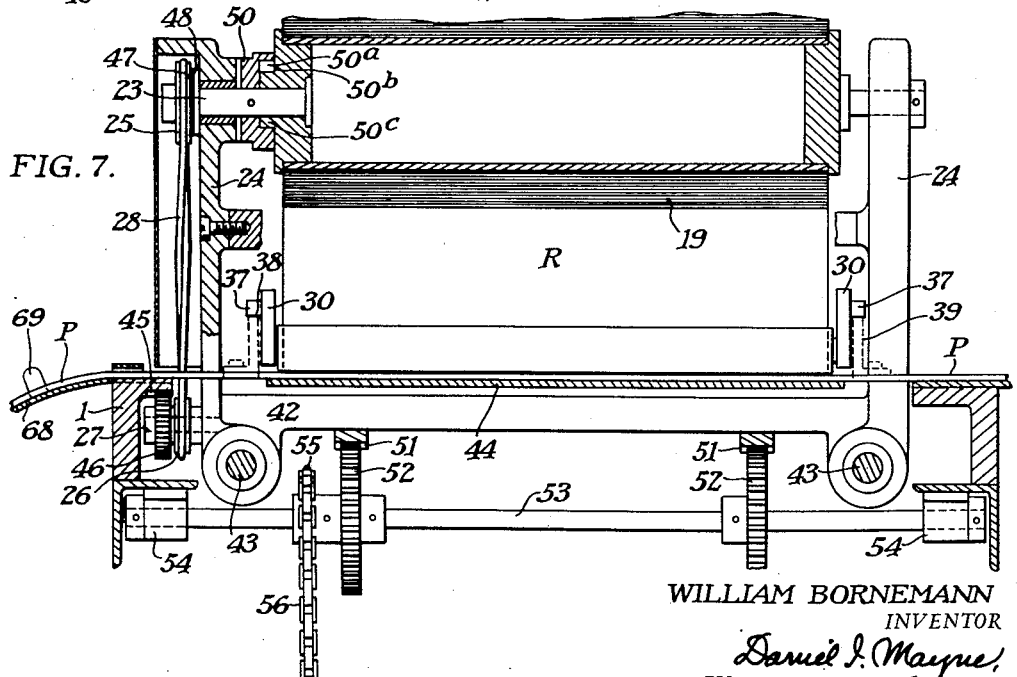
Fig. 7 is a transverse section through the slidable carriage shown in Fig. 6.

The supporting arms 24, Fig. 7, are attached to a carriage 42 which is mounted to slide on parallel ways 43 carried by the table 1. Thus, the carriage can be accurately guided in parallel relationship to a support 44 for the sensitized coated material M to iron or smooth the receiving sheet R thereon by means of the pressure roller 29.

The table top 1, Fig. 7, includes a rack 45 with which a gear 46 meshes; this gear being connected to the pulley 26. The shaft 27 supporting the gear 46 is carried by the carriage 42 and therefore moves when the carriage slides along the parallel rails 43.

As indicated in Fig. 7, the upper pulley 25 is connected to the shaft 23 through a known type of slip clutch having a clutch face 47 adjacent the pulley and a second slip clutch face 48 carried by the shaft 23. Thus, slippage can occur when a predetermined load is applied. If desired, this slippage can readily be accomplished between the belt 28 and the pulley 25, but the face plates are preferred.

Figure 10:
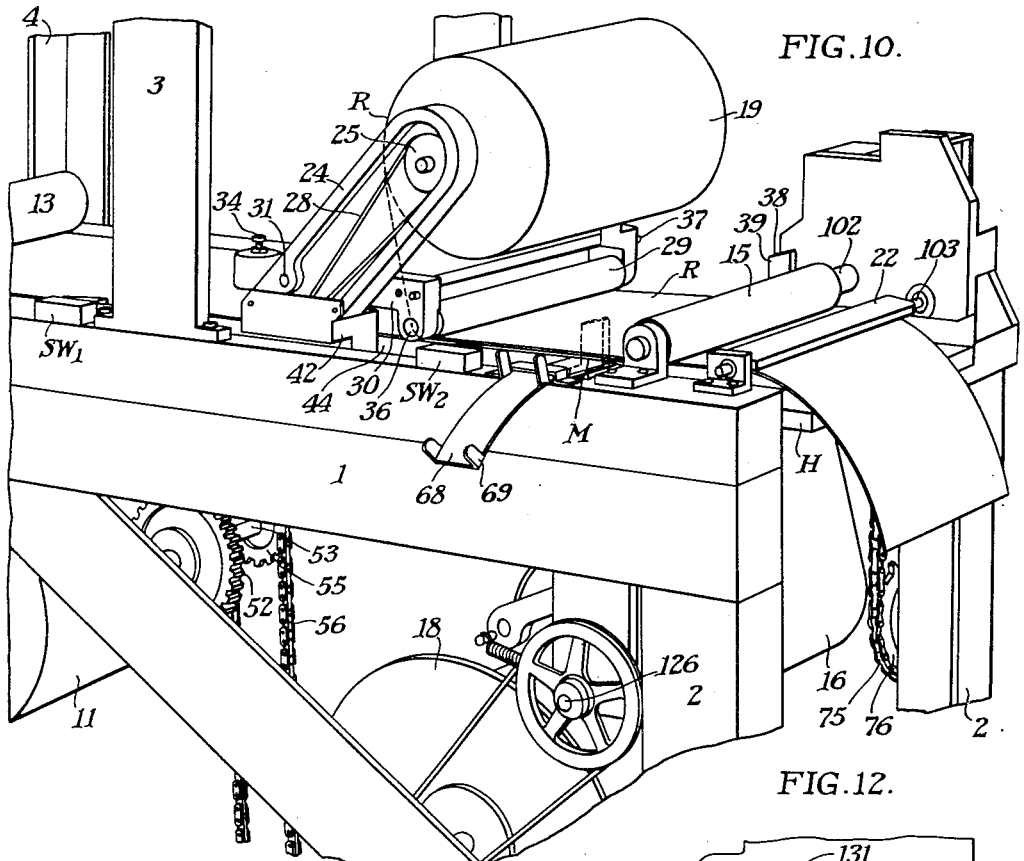
Fig. 10 is a fragmentary perspective view showing the receiving sheet rolled against the photographically sensitive coated material, the pod being omitted to better show this construction.

When the carriage is moved in the direction shown by the horizontal arrow in Fig. 6, the pin 37 slides down the cam 38 so that the spring 32 forces the pressure roller 29 with known pressure, first upon the pod 47 which lies on the sensitized coated sheet M and then the roller continues to press the receiving sheet R on the contents of the pod and the sensitized material M as the carriage moves from its Fig. 6 position to its Fig. 10 position in which the two sheets are held in intimate contact. A guide roller 13a may be fixedly mounted on the table top 1 beneath the rest position of the pressure roll 29, if desired.

When the carriage is moved, gear 46, pulleys 25 and 26, and belt 28 will permit the receiving sheet R to be unwound as the carriage moves in one direction and, when moved in a reverse direction, it will wind up the roll 19 in the direction opposite to that shown by the arrow in Fig. 6 to strip off that part of the sheet which has been processed and which bears the copy print. This is accomplished by the one-way clutch face 50 which is pinned to shaft 23 so that a roller 50a lying in a tapered slot 50b may drive hub 50c when rotated in one direction and release when driven in an opposite direction. The one-way clutch may be of this or any other known construction.

The carriage is driven by the mechanism shown in Fig. 7. The bottom of the carriage 42 is provided with a pair of spaced racks 51 meshing with gears 52 carried by a shaft 53 journaled at 54 on the table top 1. The shaft 53 carries a sprocket 55 which may be driven by a chain 56 diagrammatically shown in Fig. 21, through a motor 57 having a suitable gear reduction 58 and a main driving shaft 59 driving a sprocket 60 operating the shaft the desired amount to move the carriage first in one direction and then in the other direction through a cycle. The control for this cycle will be described later.

Figure 8:
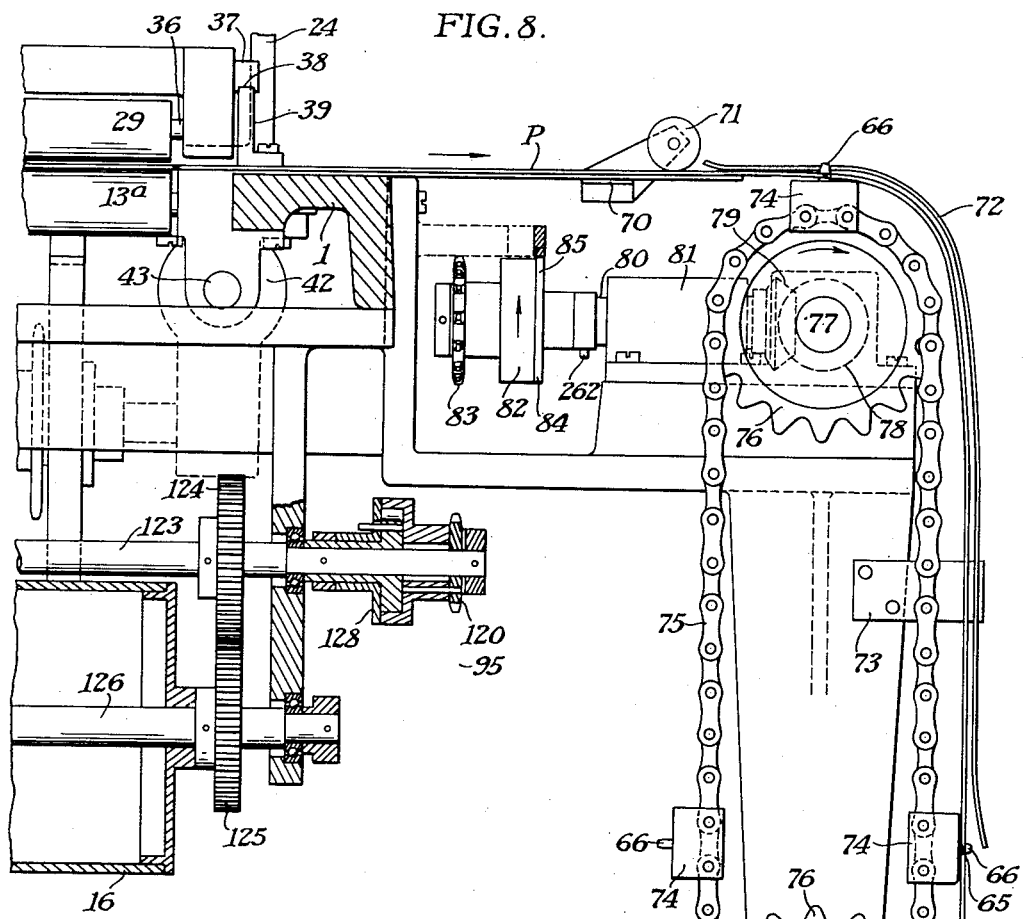
Fig. 8 is a fragmentary part section, partly in elevation, of the pod-feeding mechanism, and showing a portion of a carriage drive mechanism.

Before the rolling movement commences, it is necessary to properly position a pod P across the end of an exposed area on the sensitized material M and preferably close to and parallel with the pressure roller 29. Pods are supplied preferably in the form shown in Fig. 5 in a suitable container with the pods folded back and forth, as shown in this figure. As indicated in Fig. 4, the pods may be formed of two sheet 61 and 62 of readily rupturable material joined at their lateral edges 63 and also at their ends 64 (Fig. 5) so as to provide rectangular frangible containers which are provided with pairs of spaced indexing apertures 65. One or more pairs of these apertures may be provided for each individual pod so that driving pins 66, carried by a chain 75, shown in Fig. 8, may engage spaced apertures to positively move the pods for each exposure to present a fresh pod of processing agent for each exposure. On one side of the machine, as shown in Fig. 1, there is a suitable container 67 for the pod material. From this container the endless strip of pods is led up over a guideway 68 with pairs of guiding arms 69 across the table top 1, as shown in Figs. 3 and 6, and thence outwardly as indicated in Fig. 8 above a guide bracket 70 beneath a guide roller 71 and beneath a curved guiding plate 72 which is to hold the pod material upon the moving pins 66 as indicated in Fig. 8. The guiding plate 72 may be supported as by suitable brackets 73 so that the guiding plate will closely follow the path of the pins 66 which are carried by chain blocks 74 supported by a chain 75 passing over spaced sprockets 76. A pulley 278 mounted on the shaft 280 of the lower sprocket 76 carries a belt which drives a drum 276 (Fig. 1) pivoted on a support 277. The used and discarded pods, still connected, are wound on this drum, which may have a slip clutch plate, not shown, to compensate for the increasing diameter of the wound material.

The upper sprocket 76 is carried by a shaft 77 on which there is a beveled gear 78 meshing with a beveled gear 79 carried by the shaft 80 passing through a journal block 81. This shaft is driven by the sprocket 83 through a one-revolution clutch and slip clutch 82, shown in Fig. 9. The one-revolution clutch and slip clutch may consist of the usual slip clutch pair of face plates 84 which will slip if a predetermined load is exceeded and the face plate 84 may include a cam periphery 84 (Fig. 9) having a stop lug 86 lying in the path of a latch 87. This latch is pivotally mounted at 88 and drawn by a spring 89 against a stop pin 90 and against the cam 85. A solenoid 91 when actuated may draw in the core 92 and release the latch momentarily so that the shaft 80 may then be turned through the sprocket 83 until the lug 86 again strikes the latch 87 at which time the slip clutch will function. A pin 93 may be carried by the face plate 84 and a second latch member 94 pressed by a spring 94a into an operative position may allow the pin 93 to pass by flexing the spring 95 thus eliminating movement in a reverse direction.

The sprocket 83 is one of a series of sprockets driven by a chain 95 and shown in Fig. 21. Chain 95 is an endless chain which is driven by a sprocket 96 on a shaft 97 which is driven by a suitable gear reduction 98 from a drive motor 99. This motor may tend to turn the shaft 80 at all times, but it is unable to do so because of the slip clutch until the one-way clutch is released and the latch 87 moves away from the lug 86. When this occurs, shaft 80 will turn one revolution which is a distance just necessary to move a fresh pod into place and then will stop.

Referring again to Fig. 6, after a print has been made and wound on the roll 19, it is desirable to move the sensitized coated material M and the receiving sheet R to get ready for another print. To do this, the measuring rolls 14 and 15 and the chopper 21 and 22 are operated in timed relation. That area of the receiving sheet R which lies against the pod P when it is ruptured by the pressure roll 29 does not, of course, contain a picture when the sensitized material and the receiving sheet have been processed and, accordingly, it is desirable to chop off this unwanted portion of the sheet. This area may be one-fourth as long as the length of the print, although this dimension is, of course, only by way of example. If it is such a dimension, the measuring roll 15 may turn a single turn to position the unwanted portion of the sheet between the cutting knives 21 and 22 which may then be operated to cut off the waste material and then the measuring roll 15 may be rotated, say three times, to unwind the picture-bearing area of the receiving sheet R from the roll 19 between the knives 21 and 22, after which they again operate to cut off the print. This is accomplished in the following manner. The endless chain 95, shown in Fig. 21, passes over a feed roller sprocket 100 and over a knife-driving sprocket 101 so that these two sprockets, which are constantly driven, may drive the feed shaft 102 and the knife shaft 103 when one-revolution slip clutch assemblies on these shafts are operated.

Figure 9:
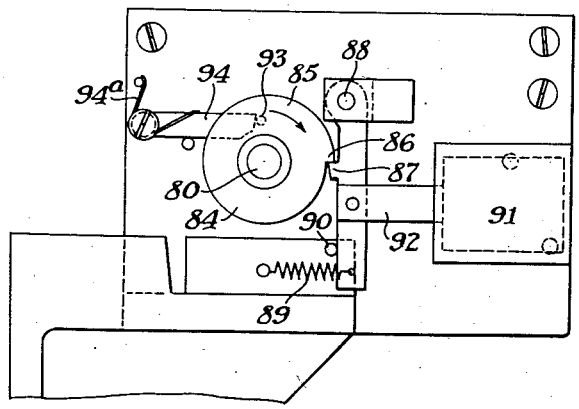
Fig. 9 is a detailed side elevation of a trip for a one-revolution shaft which is used to drive the pod-operating mechanism.
Figure 11:
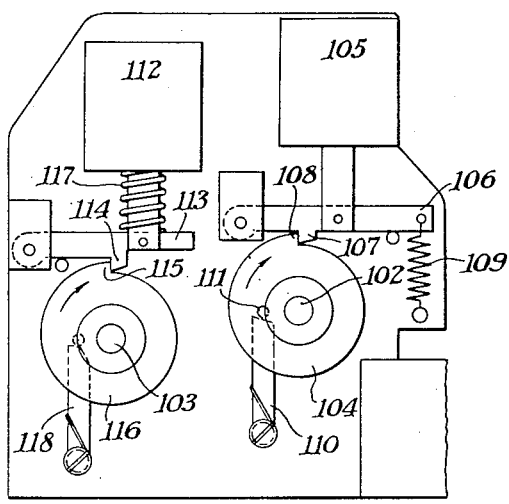
Fig. 11 shows the one-revolution trip mechanisms used to operate the feed rolls and the knife.

Referring to Fig. 11, the shafts 102 and 103 have one-revolution slip clutch assemblies of the same type as used for the pod-drive assemblies of Fig. 9. Shaft 102, which is the feed-roller shaft, may be intermittently driven when the one-revolution clutch plate 104 is released by a solenoid 105 drawing momentarily upwardly on the latch 106 to move the latch element 107 away from the clutch plate latch 108. Latch 106 is attached to a spring 109, and there is a safety latch 110 adapted to engage the pin 111 on the clutch plate to prevent rearward movement. Each time the solenoid 105 is actuated, it raises the latch 106 and allows the one-revolution slip clutch 104 to continue to revolve as long as the solenoid 105 is energized which, in this instance, will be a time sufficient for three revolutions.

In a similar manner, the shaft 103 may be allowed a single revolution when the solenoid 112 is energized to raise the latch 113 so that the latch element 114 will momentarily release the latch element 115 on the one-revolution plate 116. When the shaft 103 makes its one revolution, the movable knife blade 22 swings from the position shown in Fig. 6 in the direction shown by the arrow through 360° to cut off the receiving sheet lying across the relatively fixed knife plate 21. A spring 117 normally holds the latch downwardly adn a safety latch 118 is provided. The means for timing this mechanism will be more fully described later.

The coated material M is moved entirely separately from the receiving paper, and it is not threaded through the feed rollers 14, 15 but is passed over an idler 13a beneath pressure roll 29. From idler 13a the sensitized material M passes around a pull-down roll 16, over an idler 17 and thence is wound upon a take-up roll 18. Pull-down roll 16 is operated separately.

Figure 12:
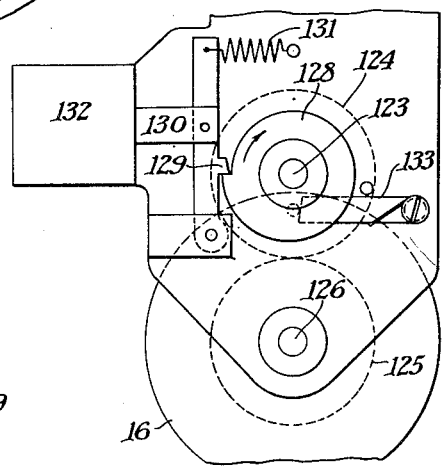
Fig. 12 is a view of the one-revolution trip mechanism used to operate the wind-up mechanism.

Referring to Fig. 21, it will be noted that the chain 95 passes about a sprocket 120 after passing over an idler 121 and a second idler 122 gives the chain a sufficient wrap around the sprocket to drive sprocket 120. This sprocket drives one end of shaft 123 on which is a gear 124 meshing with a gear 125 on shaft 126. Shaft 126 may be driven one revolution at a time through the one-revolution slip clutch shown in Fig. 12. Here, the control (a one-revolution clutch) is placed on shaft 123 for convenience, this shaft having the gear 124 meshing with the gear 125 and being of the same size so that control of shaft 123 necessarily controls shaft 126. The one-revolution clutch plate 128 may be held by a latch 129 while the clutch slips until the latch 129 is pulled against the pressure of a spring 131 by means of a core 130 when the solenoid 132 is energized. This momentarily releases the latch 133 and the slip clutch may drive shaft 123 one revolution. A safety latch 133 similar to those previously described is also employed. The size of the driving gears is arranged to move the wind-up roll the proper distance to wind up one area of the sensitized material M plus the waste area at the end across which the pod laid before the sensitized material M and the receiving sheets and pod were rolled together for processing.

Before a print can be made, the sensitized material M must be exposed. Referring to Fig. 21, the sensitized material may be exposed at the area $a$ in the following manner. A sheet of material to be copied 135 is held flat on a platen 6 and an image of this material may be formed by the objective 8 on the area $a$ by means of a shutter designated broadly as 10. This shutter, as shown in Fig. 19, may consist of a simple plate 140 pivoted at 141 and having an arm to which is attached a spring 142 tending to close the shutter. A solenoid 143 may move the shutter to an open position when energized through a core 144 so that the shutter 10 will remain open as long as the solenoid 143 is energized.

Figs. 17 and 18 show preferred operating cycles for a typical machine. As indicated in Fig. 17, the steps of each cycle are from A to I inclusive, and the graduations in numerals around the spiral chart are for convenience graduated into seconds. In this figure, operation A is exposure and this may take 5 seconds. Operation B moves the sensitized material and the pod into place, the pod being moved two-tenths of a second before the sensitized material starts to move, the entire operation taking one second. In operation C, transfer paper is rolled against the sensitized material in the next second. Operation D, the processing, is accomplished with the transfer paper, the processing agent, and the sensitized material lying flat and squeezed together for 5 seconds. In operation E, the transfer paper is stripped from the developed sensitized coating material in one second. In operation F, somewhat over a half second is employed to measure off a short length of transfer paper which is waste material which is then, in about a third of a second, cut off in operation G. In about a second and a third, in operation H, the print-bearing transfer section is moved toward the knife, and in operation I, in about two-thirds of a second, the chopper cuts off the completed print. This completes the cycle and for the next cycle material to be copied may be placed on the platen 136 so that the objective 8 may expose a fresh area of the light coated sensitive material in area $a$ diagrammatically illustrated in Fig. 21.

It is possible to speed up the operation since copy material may be placed on the platen 136 and an exposure may be made while operations E to I inclusive are being carried out, as indicated in Fig. 18. Thus, the five seconds used for exposure may take place while operations E to I are being carried out, because during these operations only the transfer paper is being affected and the sensitized material lies in position for exposure while these operations are being carried out. Thus, the cycle may be completed in 12 seconds, although this, of course, gives somewhat less time for an operator to adjust the material from which the copy is to be made.

The cycles indicated in these two charts are purely by way of example and the various timing can be changed by rearranging the cams on the control unit relative to their respective shafts to accomplish the desired end. It is, of course, possible with my improved construction, since the sensitized material will lie flat on its support and may be moved independently of cycles E to I, to make a plurality of prints from a single exposed area by cutting out operations C and D and merely moving the transfer carriage and the receiving paper thereon back and forth over the exposed area of the sensitized material, if desired. It is thought that these charts may assist in visualizing the operations of my machine and it is, of course, understood that the various times for the different steps may have to be adjusted to suit the particular sensitized material employed, the lamp brilliance, and the exposure and other variable factors which normally occur in printing operations.

Figure 20:
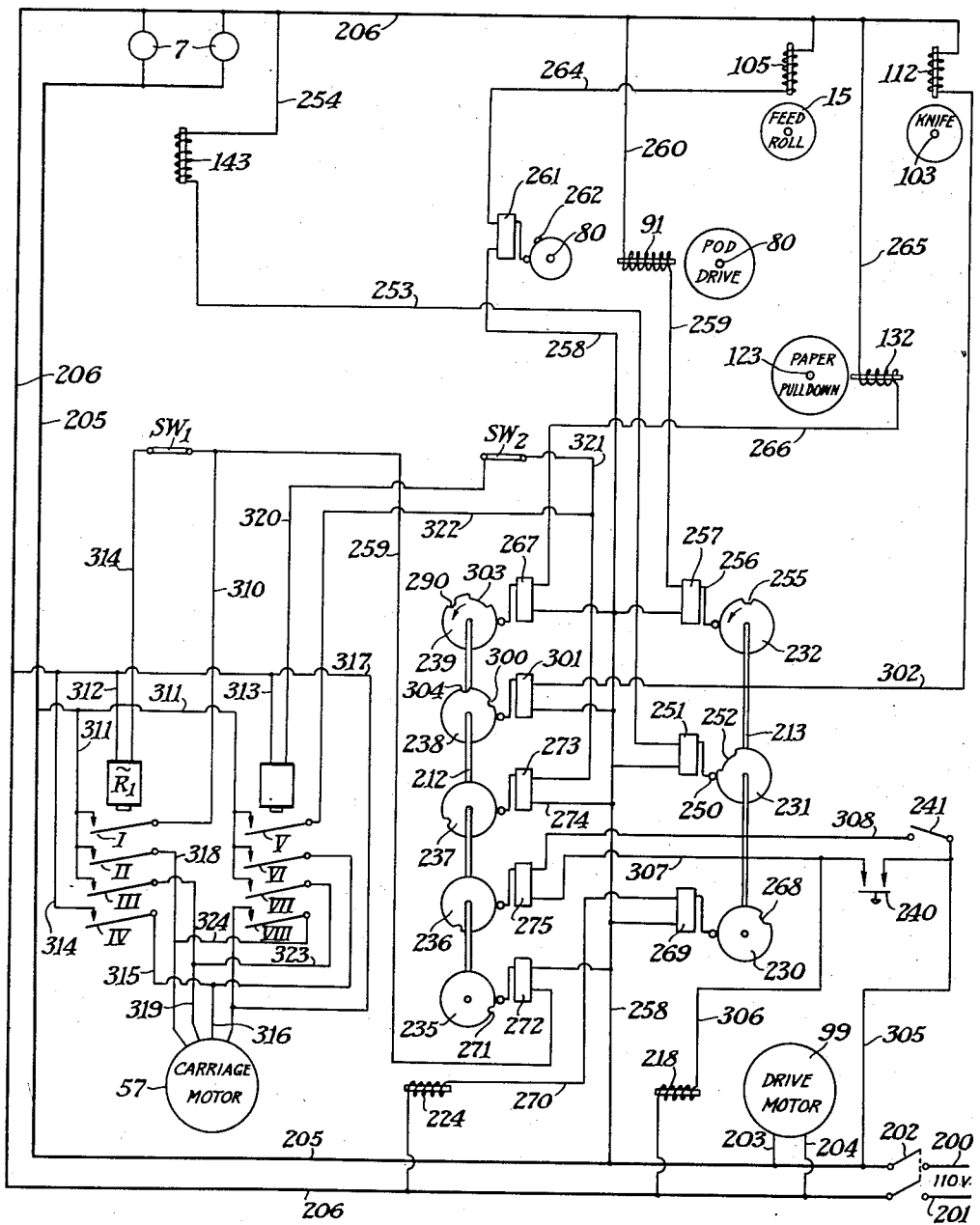
Fig. 20 is a schematic wiring diagram showing the general arrangement of the synchronizing and driving mechanisms used in the preferred embodiment of my machine illustrated.

Fig. 20 shows a shematic wiring diagram by which the movements of the various parts are synchronized. The line wires 200 and 201 furnish a source of current and a double pole switch 202 is for connecting the print-making machine to the line wires. When switch 202 is closed, the main drive motor 99 is energized through conductors 203 and 204. In addition, the lamps 7 are connected across conductors 205 and 206 so that these lamps will be on when the switch 202 is closed to illuminate the sheet 135 (Fig. 21) to be copied.

Figure 13:
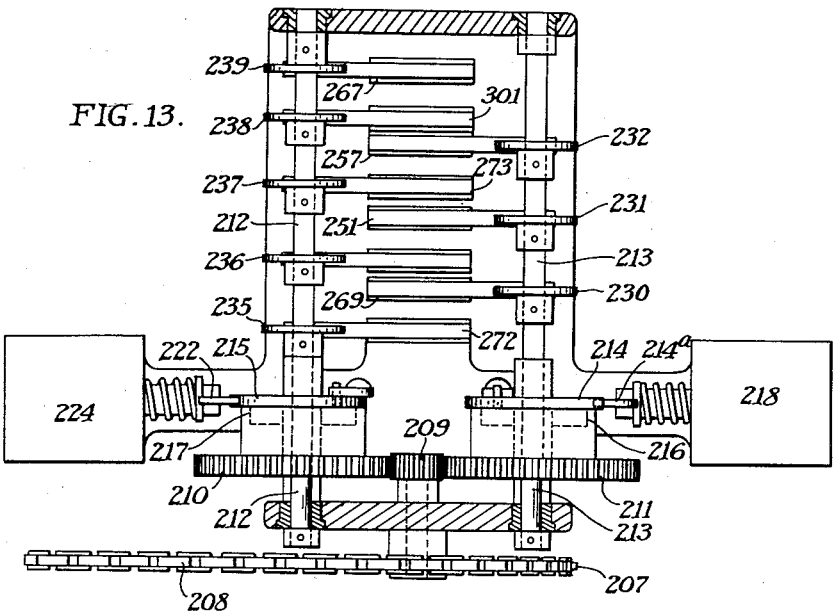
Fig. 13 is a top plan view, partially in section, showing the power-driven control unit including two synchronizing cam shafts which control the operation of the various machine parts in the proper sequence.
Figure 14:
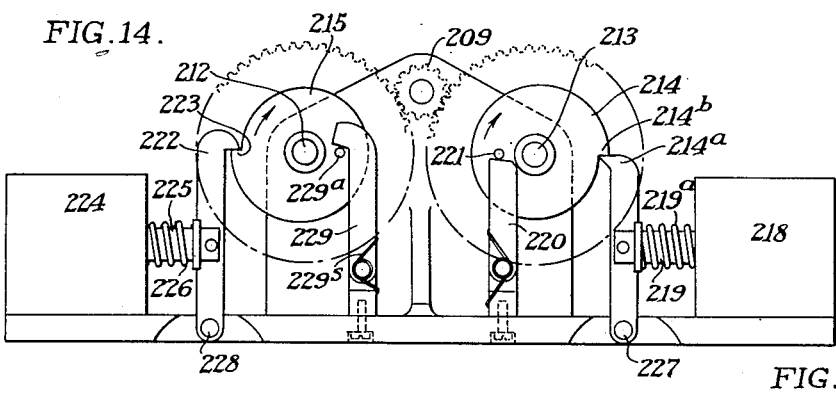
Fig. 14 is an end elevation of the synchronizing mechanism shown in Fig. 13.
Figures 15, 16:
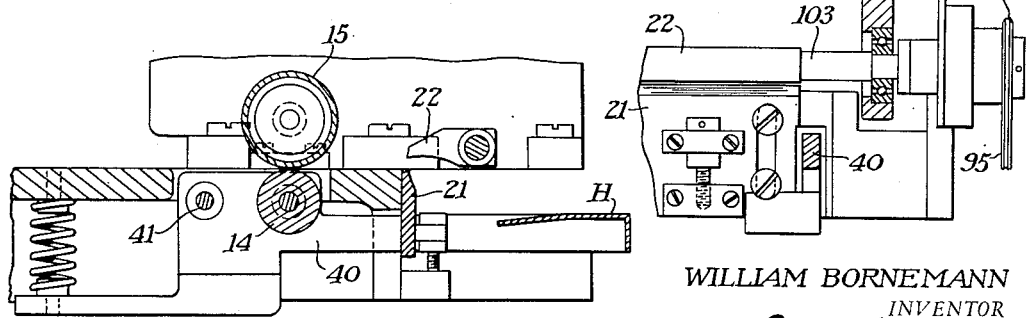
Fig. 15 is a fragmentary detail, partially in section, of the driving rolls and the paper chopper which also illustrates the means for separating the rolls for threading.
Fig. 16 is a fragmentary end elevation, partially in section, showing the means for driving and adjusting the chopper.

After closing switch 202 to energize the main drive motor 99 and the lamps 7—7, it is necessary to operate the shutter 10 to make an exposure. This is accomplished in the following manner. Referring to Figs. 13 and 14, the main control unit here shown consists of a driving sprocket 207 which is driven by a chain 208 from the motor 99. This drive sprocket drives a pinion 209 meshing with gears 210 and 211; the former turning about a shaft 212 and the latter turning about a shaft 213. There is a one-way slip clutch consisting of a cam disk 214 on one shaft and 215 on the other shaft, each disk having a slip contact with a second plate 216 on one shaft and 217 on the other shaft. These one-revolution clutches are best shown in Fig. 14 where it appears that shaft 212 may be turned only when the cam plate 215 is released by the latch member 222 which engages the latch 223 in this plate. This occurs when a solenoid 224 moves the core 225 against the action of spring 226 to momentarily release this latch. A safety latch member 229 may be pressed by a spring 229s so that the pin 229a may snap past this latch and hold the cam plate 215 against reverse movement. Similarly, shaft 213 may be turned when the cam plate 214 is released by the latch 214a moving out of the path of the latch element 214b, this occurring when the solenoid 218 moves the core 219 against the pressure of a spring 219a. A safety or rebound latch 220 is associated with cam plate 214, a stop pin 221 acting to arrest any reverse movement. The latches 214a and 222 are pivotally mounted at 227 and 228.

The cam shaft 213 has affixed thereto a series of cam disks 230, 231 and 232, each of these being turned one revolution as the shaft 213 turns one revolution. The shaft 212 has a series of cam disks 235, 236, 237, 238, 239. These cam disks have notches or cut-outs in their peripheries, as shown in Fig. 20, and these notches are arranged to operate contact switches during the revolution of their respective shafts.

When the switch 202 is closed, the driving motor tends to turn these two shafts 212—213, but they are held against turning by their clutch latches. In order to start a cycle, the following operation may take place. The operator may press the push button 240 (Fig. 20). This momentarily energizes solenoid 218 through wires 305, 306, thereby releasing the one-turn clutch 214—216 which drives shaft 213 and cams 230, 231 and 232 so that these cams may turn one revolution. The cam follower 250 on switch 251 drops into the notch 252 of cam 231, closing this switch and energizing solenoid 143 which opens the shutter 10 and holds it open for the required 5 seconds due to the length of the notch 252, and thereby exposing the sensitized material M to the copy material 135. Cam 231 opens switch 251 at the end of an exposure and releases the shutter solenoid so that the shutter 10 can now close under its spring 142. Switch 251 is connected by a wire 253 to one side of the solenoid 143 and thence by a wire 254 to wire 206, and through a common lead 258 to line 205.

Cam 232 includes a notch 255 for operating the spring switch arm 256 of a switch 257. This switch is connected to wire 205 on one side by wire 258 and by a wire 259 to the solenoid 91 which is also connected by a wire 260 to wire 206. Solenoid 91 is energized, thereby releasing the one-turn clutch on the pod-indexing mechanism, enabling the sprokets 76 to turn the chain 75 sufficiently to move the string of pods P the length of one pod unit, by means of the pins 66 and pod apertures 65. This brings a pod into position for the pressure roller. If the pod has become stuck to the sheet of sensitizing material M, this driving mechanism will break this connection and start the pod moving in advance of movement of the strip.

The pod-drive control solenoid 91 moves the pod while the sensitive material M remains stationary to break any adhesions between the used pod and material. An instant after the pod drive starts, say two-tenths of a second, a switch 261 is closed by cam 262 carried by and turning with shaft 80 (Fig. 8), thereby closing the circuit to solenoid 105 through wires 264 and 258. The feed roll 15 is therefore operated only after the pod drive starts. One revolution of the pull-down roll drive shaft 123 winds up the used sensitized material M when one-revolution slip clutch 128 is released by solenoid 105.

A cut-out 268 in cam 230 closes switch 269 momentarily energizing solenoid 224 on the control unit releasing the one-revolution slip clutch 215 which drives shaft 212 of the control unit. Switch 269 is connected to wire 258 and to a wire 270 leading to solenoid 224 and then to wire 206.

A cut-out 271 in cam 235 closes switch 272. This switch is connected, through wires 258, 259, through a normally-closed switch SW1 and wire 314 to a relay R1 and then 312 to 206 which, when thus momentarily energized, closes simultaneously a set of normally-open contacts I, II, III, IV. Through contact I and wires 310, 314, 312, a "holding" circuit is closed which maintains R1 energized after switch 272 is again opened by cam 235. However, it should be noted that switch SW1 is in this holding circuit, and that if opened, relay R1 will be de-energized. This occurs when the carriage 42 has moved a required distance toward the exposure area, when it strikes and opens SW1.

As long as SW1 is closed, motor 57 (a reversible, single-phase type) will be rotated in the direction required to traverse the carriage as above noted, the operating circuit being from main 206 through wires 314, contact IV, wires 315, 316, motor 57, wire 318, contact II, wire 311 to main 205, and also from 206 through wire 317, motor 57, wire 319, contact III, to 205.

The carriage 42 will return toward the cut-off end of the table when the cut-out in cam 237 closes switch 273, thus establishing a circuit to energize relay R2. This circuit includes wire 317 from 206, wire 313, relay R2, wire 320, SW2, and wire 321 to 273. A "holding" circuit, wire 322, contact V, wire 311, retains R2 energized, and the circuit through the motor 57 then rotates it in a direction to return the carriage toward the knife as aforesaid. This circuit extends from 206 through wires 317, motor 57, 316, contact VI, 311, to 205, and also 317, contact VIII, 324, motor 323, contact VII, 311 to 205. When the carriage reaches the end of its travel, it opens SW2 and R2 is de-energized, stopping the motor. As relays R1 and R2 are never energized during the same period, because of the spacing of the cut-outs in cams 235 and 237, no shorts or interfering circuits will be set up.

A cut-out 290 in cam 239 momentarily makes a circuit through switch 267, wires 258, 265 and 266 to energize the paper pull-down solenoid 132 for releasing one-revolution slip clutch 104. One turn of measuring roll 15 reels off the waste material.

A cut-out 304 in cam 238 closes switch 301 making a circuit through wires 258 and 302 to energize solenoid 112 releasing one-revolution slip clutch 116 driving knife 22 over knife 21 to cut off the waste material.

Another cut-out 303 in cam 239 closes snap switch 267, again energizing solenoid 132 through wires 266, 265 and 258 and keeping solenoid 132 energized for three revolutions of the one-turn shaft 102 driving the measuring or feed roll 15 three turns to wind off the picture-bearing area of the receiving sheet R. Another cut-out 300 in cam 238 will again energize solenoid 112 of the chopper knife 22 mechanism whereby the knife will cut off the picture on the receiving sheet, preferably depositing it in a suitable receptacle.

A switch 275 is provided whereby a circuit may be held operative around the push-button 240 whenever it is desired to make prints from different originals and start the exposure for print #2 before print #1 has emerged, completed, from the cut-off knife 22. To this end, a switch 241 is interposed between wires 305, 306 and wires 307, 308 to switch 275. When the cut-out in cam 236 closes switch 275, a circuit is established shunting around the push-button and again operating solenoid 218 to start shaft 213 on another cycle, before shaft 212 completes its one revolution.

Having thus described my invention, what I claim is new and desire to secure by Letters Patent of the United States is:

1. A mechanism for use on machines for making prints from an exposed light-sensitive material on a receiving sheet by rolling the latter against the former with a processing fluid therebetween, said mechanism comprising, in combination, a flat support for the exposed light-sensitive material, rails adjacent to edges of the flat plate and extending parallel thereto, a carriage slidable on the rails and over the flat plate, a pressure roller carried by the carriage for pressure transversely of the flat plate, a reversible power drive for the carriage for moving the carriage back and forth over the flat plate to roll a sheet of receiving paper against the exposed light-sensitive material with a processing fluid therebetween, said power drive including a reversible motor, a gear driven by the motor, a rack on the carriage meshing with the gear, a circuit including the motor and means for energizing the motor for driving the carriage back and forth over the support, a pair of measuring rolls, means for driving the measuring rolls, said circuit including the means for driving the measuring rolls, said circuit including switches, and a control mechanism including means for operating the switches in timed relation to energize the motor for moving the carriage across the support to roll a receiving sheet on the sensitized material with a processing solution therebetween, means in the circuit under control of the carriage for stopping the carriage movement, time delay means in the circuit for timing contact of the sensitized material and the receiving sheet with processing fluid therebetween, means in the circuit operable by the time delay means for reversing movement of the motor to drive the carriage back to its starting position, and means in the circuit operable only when the carriage is in its starting position for operating the measuring rolls.

2. A mechanism for use on machines for making prints from an exposed light-sensitive material on a receiving sheet by rolling the latter against the former with a processing fluid therebetween, said mechanism comprising, in combination, a flat support for the exposed light-sensitive material, rails adjacent to edges of the flat plate and extending parallel thereto, a carriage slidable on the rails and over the flat plate, a pressure roller carried by the carriage for pressure transversely of the flat plate, a reversible power drive for the carriage for moving the carriage back and forth over the flat plate to roll a sheet of receiving paper against the exposed light-sensitive material with a processing fluid therebetween, said power drive including a reversible motor, a gear driven by the motor, a rack on the carriage meshing with the gear, a circuit including the motor and means for energizing the motor for driving the carriage back and forth over the support, a pair of measuring rolls, means for driving the measuring rolls, said circuit including the means for driving the measuring rolls, said circuit including switches, and a control mechanism including means for operating the switches in timed relation to energize the motor for moving the carriage across the support to roll a receiving sheet on the sensitized material with a processing solution therebetween, means in the circuit under control of the carriage for stopping the carriage movement, time delay means in the circuit for timing contact of the sensitized material and the receiving sheet with processing fluid therebetween, means in the circuit operable by the time delay means for reversing movement of the motor to drive the carriage back to its starting position, and means in the circuit operable only when the carriage is in its starting position for operating the measuring rolls, a print chopper, means in the circuit and under the control of the control means for operating the switches for actuating the print chopper when the measuring rollers are at rest.

3. A mechanism for use on machines for making prints from an exposed light-sensitive material on a receiving sheet by rolling the latter against the former with a processing fluid therebetween, said mechanism comprising, in combination, a flat support for the exposed light-sensitive material, rails adjacent to edges of the flat plate and extending parallel thereto, a carriage slidable on the rails and over the flat plate, a pressure roller carried by the carriage for pressure transversely of the flat plate, a reversible power drive for the carriage for moving the carriage back and forth over the flat plate, a pod receptacle for holding a plurality of perforated pods containing a processing medium adjacent the support, a rotatable member including pins for engaging the perforations in the pods for positively moving a pod across the sensitized material and adjacent the pressure roller whereby said pressure roller may squeeze the processing solution between the sensitized material and receiving sheet as the carriage moves the pressure roller across the receiving sheet, the pod and the sensitized material lies upon its support.

4. A mechanism for use on machines for making prints from an exposed light-sensitive material on a receiving sheet by rolling the latter on the former with a processing fluid therebetween, said mechanism comprising, in combination, a support on which the exposed light-sensitive material may lie, rails extending along two sides of the support, a carriage movable on the rails, a pressure roller movably mounted on the carriage and spring-pressed towards the support, a supply station for a roll of sensitized material, a roll holder on the carriage for a roll of receiving paper, a wind-up roll for the sensitized material, measuring rolls through which the receiving paper passes, a reversible motor for moving the carriage to cause the pressure roller thereof to unwind an area of receiving paper from the roll holder on the carriage and press it upon an area of sensitized material, means for introducing a processing fluid between the sensitized material and receiving sheet to be spread by the pressure roller, a plurality of shafts, a one revolution clutch for each shaft, a solenoid release for each one revolution clutch, one of said shafts for driving a means for introducing a processing fluid between the sensitized material and receiving sheet, a second of said shafts for driving the sensitive material wind-up, a third of said shafts for driving the receiving sheet measuring rolls, a control unit comprising a power-driven shaft, and timing shafts geared thereto through one revolution slip clutches, a circuit connected to each solenoid, a switch for each solenoid actuated one revolution slip clutch, a cam operable by a timing shaft, one for operating each switch except the receiving sheet measuring roll switch, said measuring roll switch being under the control of a cam on the shaft operating the means for introducing a processing fluid, and a manual switch for closing the circuit and initiating a cycle by operating a one revolution slip clutch to turn a timing shaft whereby the cams may operate the carriage, the wind-up roll, the measuring roll, the means for introducing a processing fluid all in timed relation to complete a cycle for making a print.

5. The mechanism for use on machines for making prints from an exposed light-sensitive coated material on a receiving sheet by rolling the latter on the former with a processing fluid therebetween as defined in claim 4 characterized in that there is a one revolution slip clutch, a solenoid release, and a knife operated thereby to chop off the receiving sheet, and in that there is a cam carried by a timing shaft and a switch operated thereby for actuating the knife in timed relation.

6. The mechanism for use on machines for making prints from an exposed light-sensitive coated material on a receiving sheet by rolling the latter on the former with a processing fluid therebetween as defined in claim 4 characterized in that there is a one revolution slip clutch, a solenoid release, and a knife operated thereby to chop off the receiving sheet, and in that there is a cam carried by a timing shaft and a switch operated thereby for actuating the knife in timed relation, said cam including two spaced switch operating surfaces for operating the knife at different intervals.

7. The mechanism for use on machines for making prints from an exposed light-sensitive coated material on a receiving sheet by rolling the latter on the former with a processing fluid therebetween as defined in claim 4 characterized in that there is a one revolution slip clutch, a solenoid release, and a knife operated thereby to chop off the receiving sheet, and in that there is a cam carried by a timing shaft and a switch operated thereby for actuating the knife in timed relation, said cam including two spaced switch operating surfaces for operating the knife at different intervals, said cam for operating the measuring rolls having two switch closing surfaces to operate said rolls at different intervals and in timed relation to the operations of the knife.

8. The mechanism for use on machines for making prints from an exposed light-sensitive coated material on a receiving sheet by rolling the latter on the former with a processing fluid therebetween as defined in claim 4 characterized in that there is a one revolution slip clutch, a solenoid release, and a knife operated thereby to chop off the receiving sheet, and in that there is a cam carried by a timing shaft and a switch operated thereby for actuating the knife in timed relation, said cam including two spaced switch operating surfaces for operating the knife at different intervals, said cam for operating the measuring rolls having two switch closing surfaces to operate said rolls at different intervals and in timed relation to the operations of the knife, the first switch closing surfaces of the cams driving the receiving sheet a distance to chop off waste, and the second switch closing surfaces then driving out the printed area on the receiving sheet and again operating the knife to chop off the print.

9. A mechanism for use on machines for making prints from an exposed light-sensitive material on a receiving sheet by rolling the latter against the former with a processing fluid therebetween, said mechanism comprising, in combination, a support for the exposed light-sensitive material, rails extending along two edges of the support and located a fixed distance from the two edges of the support, a carriage movable on the rails and over the support, said carriage including a roll holder for a roll of receiving paper and connections between the roll holder and the support tending to turn the roll holder in one direction when the carriage is moved in one direction, a pressure roller carried by the carriage and positioned to press upon the support throughout the movement of the carriage to uniformly press a receiving sheet upon the exposed light-sensitive material with a processing fluid therebetween, a reversible motor operatively connected to the carriage for driving the carriage to cover and uncover the support, a circuit, the reversible motor being connected to the circuit, means for operating the motor in a forward and in a reverse direction included in the circuit, means for timing reverse movement after each forward movement of the motor included in the circuit for establishing a predetermined time during which the receiving sheet may be held in contact with the exposed light-sensitive sheet to receive an image therefrom, control means in the circuit for energizing the motor for moving the carriage over the support, holding the carriage over the support, and moving the carriage from the support in sequential timed relation, whereby an image may be received by the receiving sheet from the processed, exposed, light-sensitive material.

10. A mechanism for use on machines for making prints from an exposed light-sensitive material on a receiving sheet by rolling the latter against the former with a processing fluid therebetween, said mechanism comprising, in combination, a support for the exposed light-sensitive material, rails extending along two edges of the support and located a fixed distance from the two edges of the support, a carriage movable on the rails and over the support, the carriage including a roll holder for a roll of receiving paper, and connections between the roll holder and the support tending to turn the roll holder in one direction when the carriage is moved in one direction, and a one-way clutch included in said connections whereby when the carriage is moved in a reverse direction, there is no tendency to turn the roll holder, a pressure roll carried by the carriage and positioned to press upon the support throughout the movement of the carriage to uniformly press a receiving sheet upon the exposed light-sensitive material with a processing fluid therebetween, a reversible motor operatively connected to the carriage for driving the carriage to cover and uncover a support, a circuit, the reversible motor being connected to the circuit, means for operating the motor in a forward and in a reverse direction included in the circuit, a means for timing reverse movement after each forward movement of the motor included in the circuit for establishing a predetermined time during which the receiving sheet may be held in contact with the exposed light-sensitive sheet to receive an image therefrom, control means in the circuit for energizing the motor for moving the carriage over the support, holding the carriage over the support, and moving the carriage from the support in sequential timed relation, whereby an image may be received by the receiving sheet from the processed, exposed, light-sensitive material.

11. A mechanism for use on machines for making prints from an exposed light-sensitive material on a receiving sheet by rolling the latter against the former with a processing fluid therebetween, said mechanism comprising, in combination, a support for the exposed light-sensitive material, rails extending along two edges of the support and located a fixed distance from the two edges of the support, a carriage movable on the rails and over the support, a roll holder included in the carriage for holding a roll of receiving paper, a rack, a gear carried by the support meshing with the rack, a pulley turned by the gear, a pulley carried by the roll holder and connected to the first pulley by a belt, and a one-way clutch on the roll holder whereby the roll holder may be turned through the rack and pulley only when the carriage is moving in a direction to uncover the support to strip the image-bearing receiving sheet from the exposed and processed light-sensitive, image-bearing material, a pressure roller carried by the carriage and positioned to press upon the support through the movement of the carriage to uniformly press a receiving sheet upon the exposed light-sensitive material with a processing fluid therebetween, a reversible motor operatively connected to the carriage for driving the carriage to cover and uncover the support, a circuit, the reversible motor being connected to the circuit, means for operating the motor in a forward and in a reverse direction included in the circuit, a means for timing reverse movement after each forward movement of the motor included in the circuit for establishing a predetermined time during which the receiving sheet may be held in contact with the exposed light-sensitive sheet to receive an image therefrom, control means in the circuit which energizes the motor for moving the carriage over the support, holding the carriage over the support, and moving the carriage from the support in sequential timed relation, whereby an image may be received by the receiving sheet from the processed, exposed, light-sensitive material.

WILLIAM BORNEMANN.

REFERENCES CITED

The following references are of record in the file of this patent:

UNITED STATES PATENTS

| Number | Name | Date |
|---|---|---|
| 35,570 | Sibley | June 10, 1862 |
| 1,816,290 | Klimis | July 28, 1931 |
| 2,380,378 | Allen | July 31, 1945 |
| 2,435,718 | Land | Feb. 10, 1948 |
| 2,443,154 | Wolff | June 8, 1948 |